United States Patent
Messing

(10) Patent No.: US 7,347,213 B2
(45) Date of Patent: Mar. 25, 2008

(54) DRIVE-THROUGH VEHICLE CAR WASH WITH A BALANCED ROOF BRUSH

(75) Inventor: Horst Messing, Lindler (DE)

(73) Assignee: MTE Messing Technology & Equipment GmbH (DE)

( * ) Notice: Subject to any disclaimer, the term of this patent is extended or adjusted under 35 U.S.C. 154(b) by 539 days.

(21) Appl. No.: 10/505,607

(22) PCT Filed: Aug. 2, 2002

(86) PCT No.: PCT/EP02/08632

§ 371 (c)(1),
(2), (4) Date: Aug. 20, 2004

(87) PCT Pub. No.: WO03/070532

PCT Pub. Date: Aug. 28, 2003

(65) Prior Publication Data

US 2005/0072450 A1    Apr. 7, 2005

(30) Foreign Application Priority Data

Feb. 20, 2002    (DE) .............................. 102 07 050

(51) Int. Cl.
*B08B 3/00*    (2006.01)
*B60S 3/00*    (2006.01)

(52) U.S. Cl. .................... 134/123; 15/53.3; 15/DIG. 2; 15/97.3; 15/23.1

(58) Field of Classification Search ................ 134/123; 15/53.3, DIG. 2, 97.3, 23.1
See application file for complete search history.

(56) References Cited

U.S. PATENT DOCUMENTS 3,501,794 A * 3/1970 Solomon ................... 15/53.3
3,706,709 A * 12/1972 Bevier ........................ 15/53.2
4,039,014 A * 8/1977 Sellars ....................... 15/53.3
4,118,068 A    10/1978 Föhl
4,239,551 A * 12/1980 Smith ............................ 134/6
5,613,260 A    3/1997 Belanger et al.

FOREIGN PATENT DOCUMENTS

| AU | A 27 194 | 10/1972 |
|----|----------|---------|
| DE | 195 32 097 | 3/1996 |
| DE | 199 44 478 | 3/2001 |
| EP | 0 854 070 | 7/1998 |
| FR | 1196147 | 11/1959 |
| FR | 1465327 | 1/1967 |

* cited by examiner

*Primary Examiner*—Michael Barr
*Assistant Examiner*—Jason Heckert
(74) *Attorney, Agent, or Firm*—Robert W. Becker; Robert W. Becker Assoc.

(57) ABSTRACT

An automatic drive-through vehicle wash is provided in which the vehicle is conveyed, by means of a drive, along a conveying stretch between wash rotors arranged on both sides of the conveying stretch. A rotating cleaning element extends transversely to the feed direction of the vehicle and principally impacts the front, the hood, and the roof areas of the vehicle, as well as the trunk of the vehicle. The cleaning element is supported by two pivotable carry levers that, together with a tie rod and a lever arm, each form a parallelogram spacer bar. Counter-weights on extension arms of each parallelogram spacer bar ensure that the cleaning element is balanced relative to the vehicle in any position and contacts the vehicle with a set contact force.

6 Claims, 4 Drawing Sheets

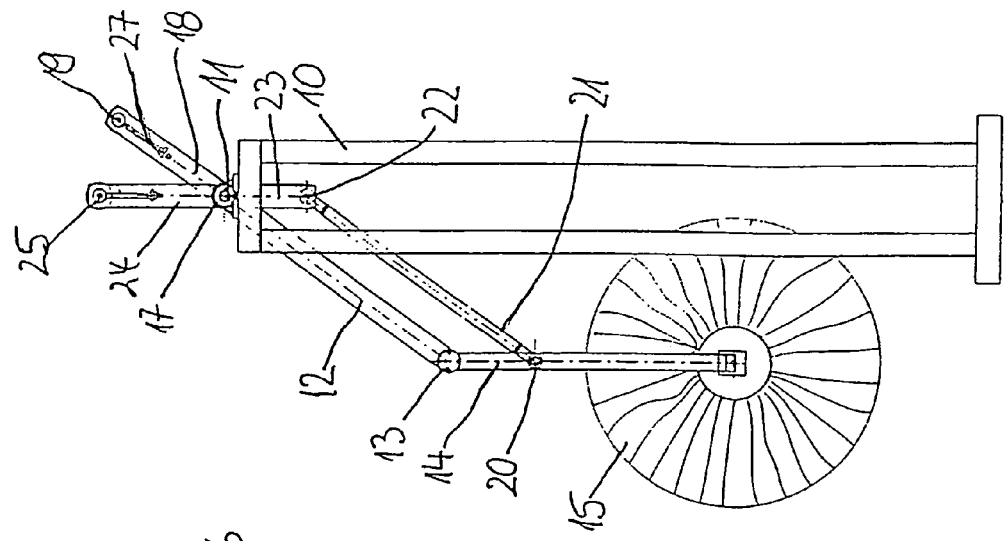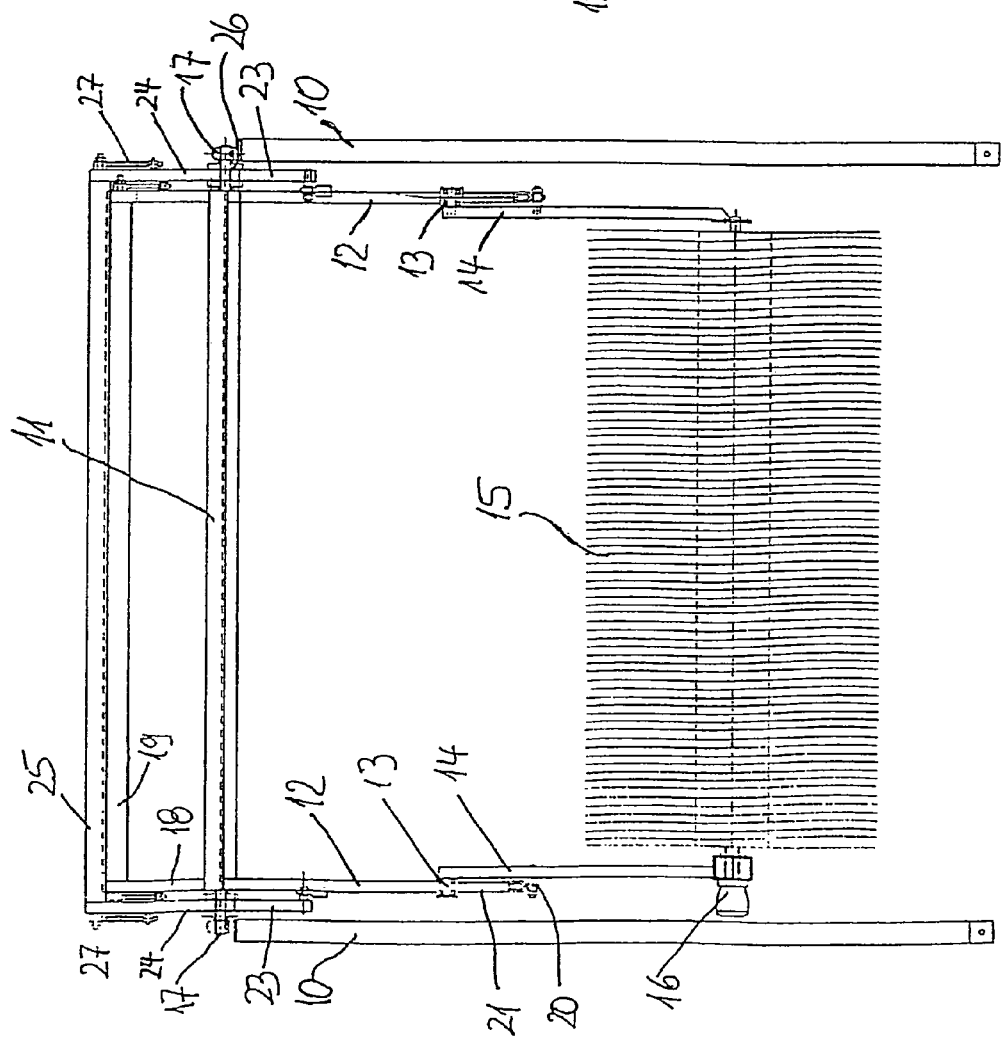

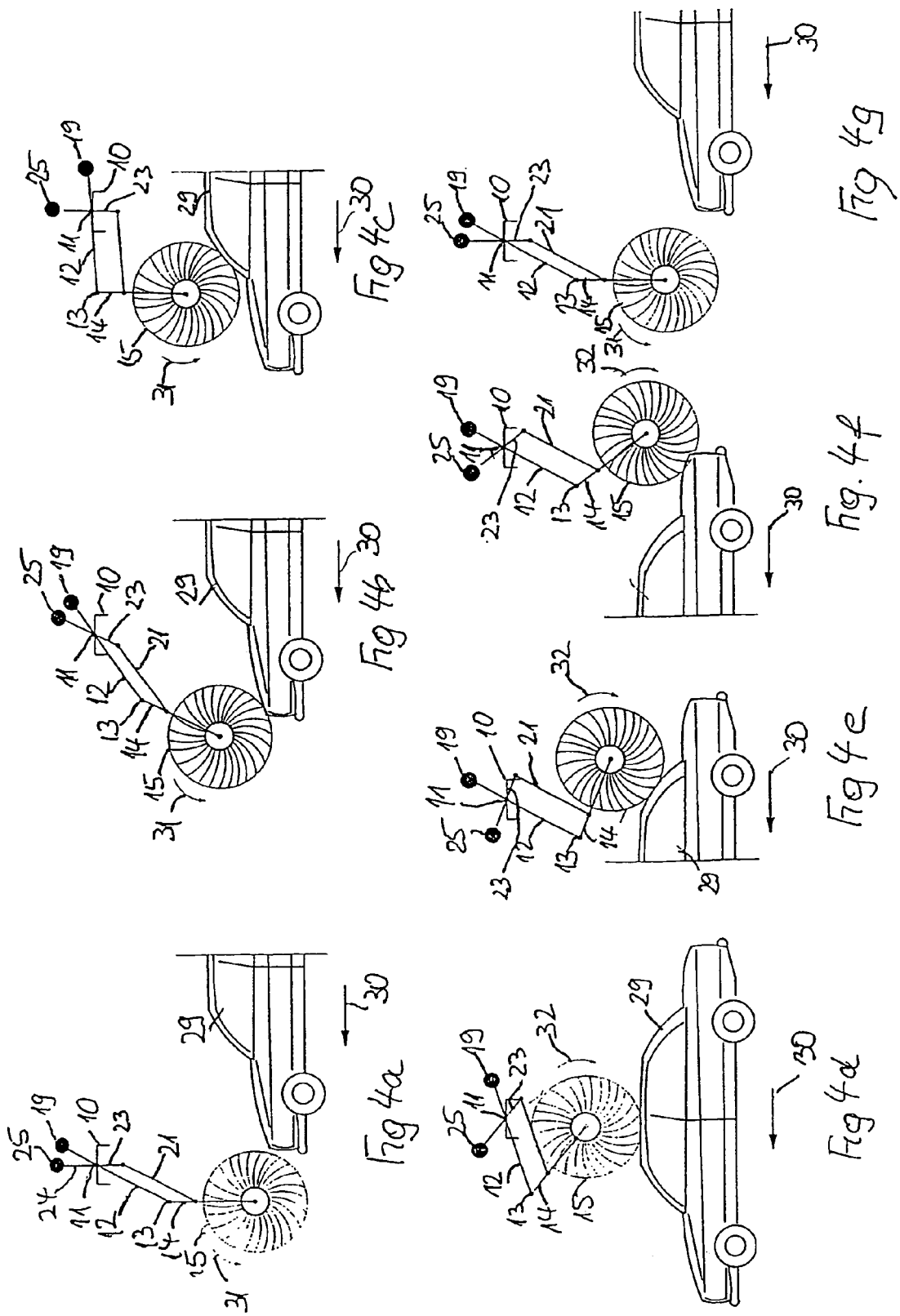

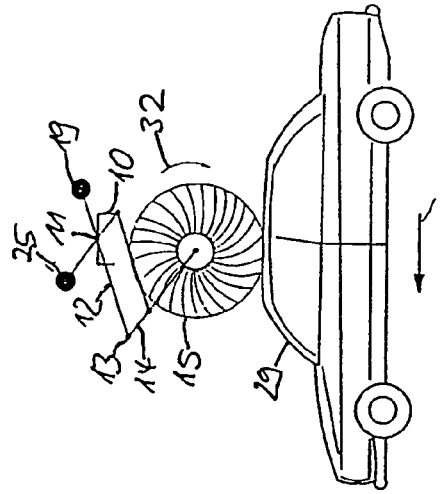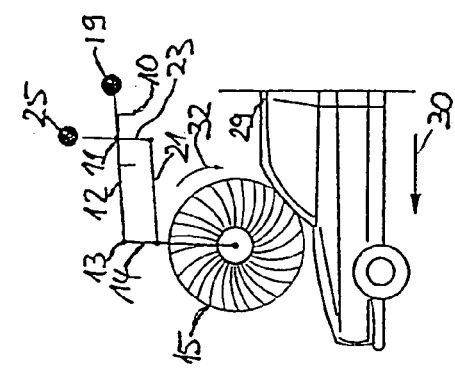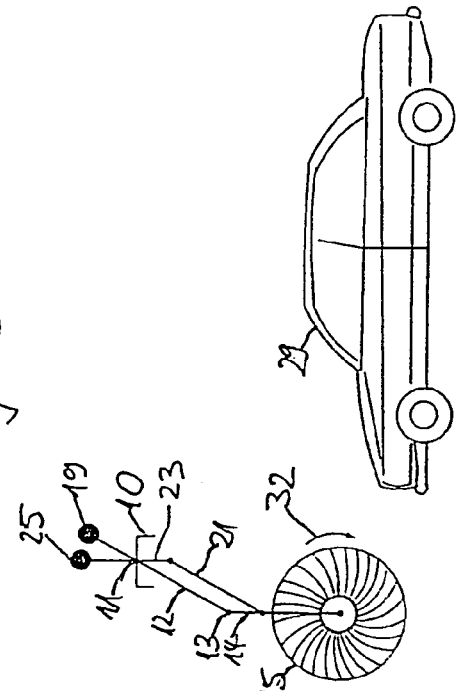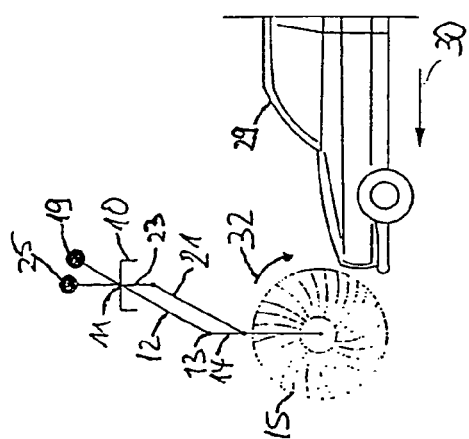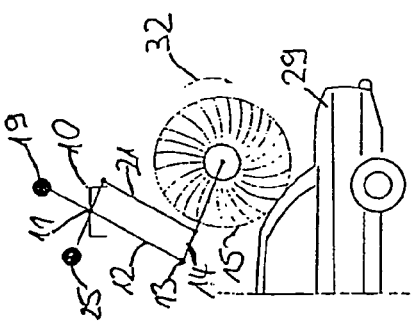

DRIVE-THROUGH VEHICLE CAR WASH WITH A BALANCED ROOF BRUSH

BACKGROUND OF THE INVENTION

The invention relates to an automatic drive-through vehicle wash, in which the vehicle is conveyed, by means of a drive, along a conveying stretch between wash rotors arranged on both sides of the conveying stretch, and in which a rotating cleaning element is provided that extends transversely to the feed direction of the vehicle and that principally impacts the front, the hood, and the roof areas of the vehicle, as well as the trunk of the vehicle, the cleaning element being supported by two pivotable carry levers that are arranged on both sides of the conveying stretch and are supported by a shaft extending overhead the conveying stretch.

A drive-through vehicle wash with the above-noted features is described in DE 195 32 097 A1. In this known drive-through vehicle wash, the rotating cleaning element, that can be reversibly changed in its rotational direction, is supported between two carry levers that are each, respectively, non-rotatably connected with a shaft extending overhead the conveying stretch, whereupon the carry levers, via a cable drive provided for such purpose, are pivotable, with the cleaning element supported thereby, around the shaft axis. Additionally, the cleaning element is arranged to be longitudinally displaceable along the carry levers by means of driven slide guides. In this known drive-through vehicle wash, the contact of the cleaning element is respectively maintained or adjusted by the pivoting undertaken by the carry arms as they are driven by the drive provided for this purpose as well as by the displacement of the cleaning element along the carry arms that is effected by means of a further drive. The disadvantage associated with this arrangement is that two drives for the control of the cleaning element must be maintained and controlled, whereby the arrangement and operation of this known drive-through vehicle wash are correspondingly burdensome. This leads to the consequence that, upon the falling out of, as well, only one drive, the unit is no longer functional.

SUMARY OF THE INVENTION

The invention provides a solution to the task of configuring a simpler and more operationally reliable drive-through vehicle wash having the aforementioned features, as well as lowering the operational costs of the unit.

The solution of this challenge is set forth in the advantageous embodiments and further configurations of the inventions as set forth in the content of the patent claims which follow this description.

The invention provides in its core concept that each carry lever is coupled, via an interposed link, with a spacer bar lever that is non-rotatably secured to a shaft that itself is rotatably supported, that the spacer bar lever comprises an extension arm that extends beyond the spacer bar lever's securement to the shaft and has a counter-weight thereon and that, toward the goal of configuring a parallelogram spacer bar, each carry lever is connected in a linked manner with a tie rod on whose other end a lever arm is, via a link, engaged, the lever arm being rotatably supported on the shaft and supporting, on an extension arm thereof extending beyond its rotational support on the shaft, a counter-weight such that the cleaning element is balanced relative to the vehicle in any position via displaceable parallelogram spacer bars with the counter-weights and contacts the vehicle with a set contact force.

The advantage is associated with the invention that, due to the suspended support of the cleaning element on a parallelogram spacer bar that is relatively balanced via counter-weights in all positions of its components relative to each other, it is assured that there is, in any position of the cleaning element relative to the vehicle to be cleaned, a contact force that is sufficient and that ensures a good wash result without the need to provide any special drives. As a consequence thereof, savings on capital- and operational-costs are associated with the inventive drive-through vehicle wash; additionally, the operational reliability is enlarged. The contact force of the cleaning element on the vehicle is thereby determined via the inherent weight of the cleaning element and the adjustment of counter-weights that compensate, up to achieving the desired contact force, for this inherent weight.

In view of the fact that the inherent weight of the cleaning element varies as a function of the conveying manner of the drive-through vehicle wash via a more or less successful uptake of water or via wearing of the cleaning element, it is provided, in accordance with an embodiment of the invention, that the counterweights are displaceably arranged on the extension arms of the spacer arms and the lever arms of the parallelogram spacer bars that support the counter-weights so that the contact force can be regulated via the adjustment of the counter-weights.

In accordance with an embodiment of the invention, it is provided that the counter-weights are arranged extending overhead the conveying stretch parallel to the shaft and are respectively connected with the extension arms of the spacer bar levers and the lever arms of the parallelogram spacer bars arranged on both sides of the conveying stretch; in this connection, the stability of the parallelogram spacer bars that are provided on both sides of the conveying stretch for supporting the cleaning element is improved.

It can be provided that, in the inactive position of the cleaning element with the carry arms in vertical orientations, the spacer bar levers, which are non-rotatably connected with the shaft, extend obliquely downwardly in the feed direction of the vehicle in a manner such that the lever arms, which are connected via the tie rods with the carry arms and which support the counter-weights, are oriented parallel to the carry arms. As a consequence thereof, it is ensured, in an advantageous manner, that, at the end of the cleaning process for a vehicle, the cleaning element is in the start position for the cleaning of the next-following vehicle so that a close-following conformation to the vehicle to be cleaned is possible.

The advantage is generally associated with the invention that, by reason of the inventive support of the cleaning element, operation of the cleaning element with or without a change of rotational direction is possible. To this extent, it is provided, in accordance with an embodiment of the invention, that the rotational direction of the cleaning element can be reversibly changed.

In view of the driving operation of the cleaning element, it can be provided that the drive of the cleaning element is configured as a motor disposed relative to the rotational axis of the cleaning element.

BRIEF DESCRIPTION OF THE DRAWINGS

The embodiments of the invention are further illustrated in the drawings which are hereinafter described. The drawings show:

FIG. 1 the support, shown in a front view, of a cleaning element extending transversely to the feed direction of a vehicle, FIG. 2 the subject matter of FIG. 1 shown in a side view, FIG. 3a-d the support, as shown in FIGS. 1 and 2, of the cleaning element in different positions with the thereby-dictated positions of the parallelogram spacer bars, FIG. 4a-g the operating positions of the cleaning element, shown in a schematic illustration, during the cleaning of a vehicle, with reversal of the rotational direction of the cleaning element, FIG. 5a-f the operating positions of the cleaning element corresponding to those shown in FIG. 4 during the cleaning of a vehicle without reversal of the rotational direction of the cleaning element.

DESCRIPTION OF PREFERRED EMBODIMENTS

Figure 3D:
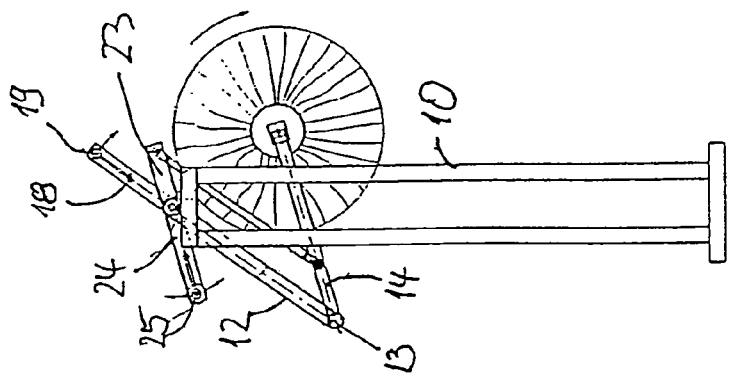

Components of the drive-through vehicle wash are the supports 10 that are erected laterally of the conveying stretch and on which a shaft 11 is supported, the shaft extending overhead the conveying stretch, whereby the shaft 11 is rotatedly supported in bearings 17. Spacer bar or guide levers 12 provided on both sides of the conveying stretch intercept the shaft 11 and are connected therewith in a non-rotating manner. On each end of the spacer bar lever 12 that extends obliquely downwardly in the feed direction 30 of a car, a carry lever 14 is, via a link 13, movably secured to the spacer bar lever end, whereby the carry levers 14 support therebetween a rotating cleaning brush that serves as the cleaning element. A motor 16 is disposed on a side on a carry lever 14 relative to the rotational axis of the cleaning element 15, the motor driving the rotational movement of the cleaning element 15. As can be seen in more detail in FIG. 2, each spacer bar lever 12 extends beyond its intersecting connection with the shaft 11 in the form of an extension arm 18, whereby a counterweight 19 is arranged on the extension arm 18. In the illustrated embodiment, the counterweight 19 is arranged overhead parallel to the shaft 11 and is supported from both sides by the extension arms 18 of the spacer bar levers 12 so that a stabilization of the space arrangement is provided.

To effect the configuration of a parallelogram spacer bar, a tie rod 21 engages, via a link 20, a respective carry lever 14, the tie rod extending parallel to the spacer bar lever 12 and being connected with a lever arm 23 via a link 22 arranged on the free end of the tie rod, the lever arm, in turn, leading to the shaft 11 and being rotatably coupled therewith via a bearing 26 on the shaft 11. Each lever arm 23 extends, as well, with an extension arm 24 beyond its bearing 26 on the shaft 11 and supports a counterweight 25 that, in the same manner as the counterweight 19, is configured as a weight extending overhead parallel to the shaft 11. Both counterweights 19, respectively, 25, on the extension arms 18, respectively, 24, of the spacer bar levers 12 or, respectively, of the lever arms 23, are displaceable in their spacing from the shaft 11 via an adjustment device 27.

Figure 3C:
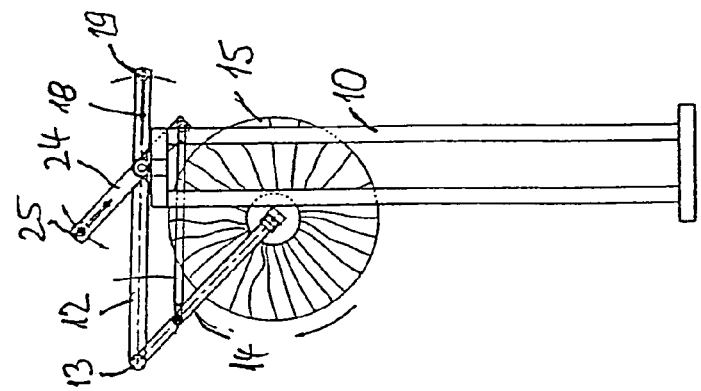
Figure 3B:
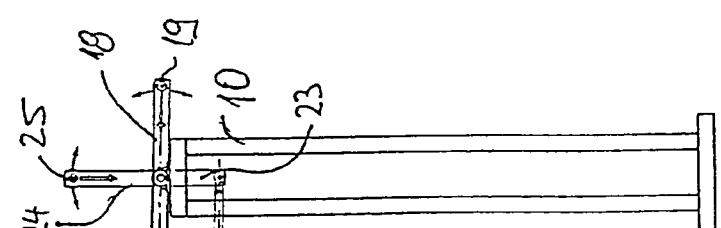
Figure 3A:
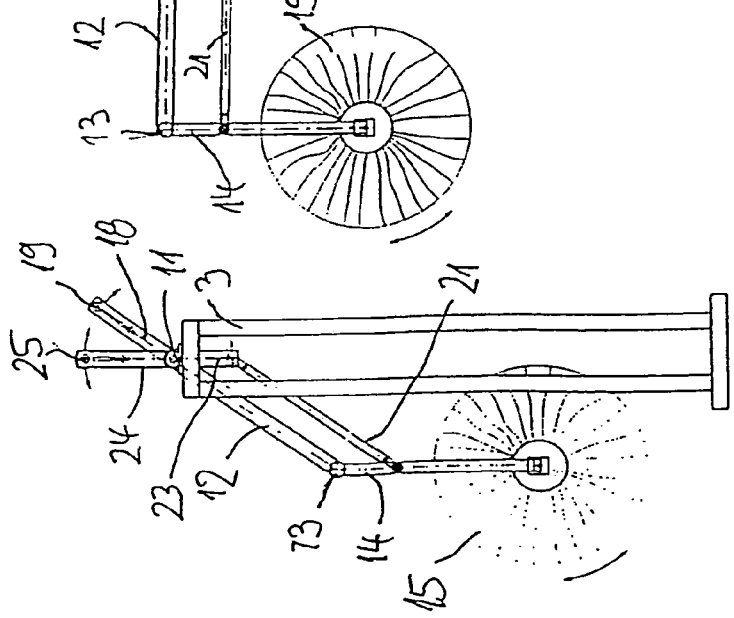

The movements of the parallelogram spacer bars that are arranged on both sides of the conveying stretch for supporting the cleaning element 15 are shown in FIGS. 3a-3d with respect to various positions of the cleaning element 15, whereby these positions are found again in the hereinafter following description of the steps of the cleaning of a car. In this connection, the cleaning element 15 moves respectively relative to the shaft 11 as a fixed axis, as the spacer bar levers 12 as well as the lever arms 23 are respectively connected with or supported on the shaft 11.

FIGS. 4a-4g illustrate the steps of a car cleaning by means of the inventively supported cleaning brush, whereby, in this embodiment, a change of rotational direction of the cleaning element 15 is provided. Concerning further details thereof, the car 29, upon its feed-in in the feed direction indicated by the arrow 30, reaches the cleaning element 15 which, initially, rotates in opposition to the feed direction 30 in the direction shown by the arrow 31. In this outlet position or, respectively, inactive position, of the cleaning element 15, the carry levers 14 are vertically oriented, whereby the spacer bar levers 12, which are non-rotatably connected with the shaft 11, extend obliquely downwardly in the feed direction 30 of the car 29 such that the lever arms 23 that are linked via the tie rods 21 with the carry levers 14 and that support the counterweight 25, extend parallel to the carry levers 14. With the feed of the car 29 in accordance with FIGS. 4b and 4c, the cleaning element 15 is lifted, whereby, in particular, the carry levers 14 and the spacer bar levers 12 are relatively balanced in any position of the cleaning element 15, via the parallelogram spacer bars on both sides and the correspondingly provided counterweights 19 and 25. Once the cleaning element 15 has reached the roof of the car, as the cleaning element is constrained to do upon further feed of the car 29, the rotational direction of the cleaning element 15 is now reversed (arrow 32) in the feed direction 30 of the car 29, whereby, by reason of the friction that now arises between the cleaning element 15 and the roof of the car 29, a pull in the direction of the trunk of the car occurs so that the counterweights 19 and 20 are correspondingly displaced and, consequently, are again balanced, via the parallelogram spacer bars, relative to the cleaning element 15. Due to the counterweights 19 and 20 and the subsequently occurring friction, the cleaning element 15 is pulled downwardly in the position shown in the FIGS. 4e and 4f, whereby the cleaning element 15 reaches the deepest point on the trunk of the car 29. At the end of the movement, the rotational direction of the cleaning element 15 is again reversed in the direction of the arrow 31 in opposition to the feed direction and is, in the position corresponding to that of FIG. 4g, ready for the cleaning of the next-following car in accordance with FIG. 4a.

The cleaning of a car occurs in a similar manner if no change of the rotational direction of the cleaning element 15 is provided whereby, in this event, the rotational direction of the cleaning element 15 is respectively set in accordance with the arrow 32 in the feed direction 30 of the car 29. As is shown in FIG. 5a, the car 29 reaches, upon its feed-in, the cleaning element 15, whereby, upon further feed of the car 29 corresponding to FIG. 5b, the cleaning element 15 is lifted via the carry levers 14 and the spacer bar levers 12 and is, consequently, relatively balanced via the counterweight 19. Due to the consequently occurring friction of the cleaning element 15 on the car 29, the cleaning element 15 has already been compelled to attempt to travel on the hood and the windshield in opposition to the feed direction 30 of the car 29 and can, consequently, deviate upwardly while always remaining in contact with the top surface of the car. Via the already-described pull of the cleaning element 15 in the direction of the trunk of the car, there follows a course of movement as shown in FIGS. 5c-5f such as has already been described in connection with FIGS. 4d-4g.

The features of the subject matter of this case as set forth in the herein above description, the patent claims, the summary, and the drawings, can be important individually or in desired combinations with one another in order to realize the invention in its various forms.

The specification incorporates by reference the disclosure of PCT/EP02/08632 filed 2 Aug. 2002 and German Patent Application 102 07 050.4 filed 20 Feb. 2002. The present invention is, of course, in no way restricted to the specific disclosure of the specification and drawings, but also encompasses any modifications within the scope of the appended claims.

The invention claimed is:

1. An automatic drive-through vehicle wash, comprising:
    a conveying stretch along which a vehicle to be washed is conveyed in a feed direction;
    means for conveying a vehicle along the conveying stretch;
    wash rotors arranged on both sides of the conveying stretch;
    a rotating cleaning element extending transversely to the feed direction of the vehicle, the cleaning element being operable to contact at least one of the front, the hood, the roof, and trunk areas of the vehicle;
    a shaft extending overhead the conveying stretch and being rotatably supported for rotation about an axis of the shaft;
    two pivotable carry levers arranged on both sides of the conveying stretch and supported by the shaft, the cleaning element being supported by the two pivotable carry levers;
    two spacer bar levers each non-rotatably secured to the shaft on a respective side of the conveying path, each carry lever being coupled, via an interposed link, with one of the spacer bar levers, each spacer bar lever having an extension arm that extends beyond the spacer bar lever's securement to the shaft, and the extension arms supporting a counter-weight thereon;
    two links;
    two tie rods;
    two lever arms, each lever arm being rotatably supported by a rotational support on the shaft and each lever arm supporting, on an extension arm thereof extending beyond its rotational support on the shaft, a counterweight; and
    two links, each carry lever being connected in a linked manner via one of the links with one of the tie rods and each lever arm being connected, via one of the links, with a tie rod so as to thereby form a parallelogram spacer bar, whereupon the cleaning element is balanced relative to the vehicle in any position via self-displacing parallelogram spacer bars with the counter-weights and contacts the vehicle with a set contact force.

2. A drive-through vehicle wash according to claim 1, wherein the counterweights supported on the extension arms of the spacer arms and the lever arms of the parallelogram spacer bars are displaceably arranged.

3. A drive-through vehicle wash according to claim 1, wherein the counterweights are arranged extending overhead the conveying stretch parallel to the shaft and are respectively connected with the extension arms of the spacer arms and the lever arms of the parallelogram spacer bars arranged on both sides of the conveying stretch.

4. A drive-through vehicle wash according to claim 1, wherein, in an inactive position of the cleaning element with the carry levers being vertically oriented, the spacer bar levers, which are non-rotatably connected with the shaft, extend obliquely downwardly in the feed direction of the vehicle such that the lever arms that are linked via the tie rods with the carry levers and that support the counterweight extend parallel to the carry levers.

5. A drive-through vehicle wash according to claim 1, wherein the cleaning element is configured for switching between one rotational direction and the respective opposite rotational direction.

6. A drive-through vehicle wash according to claim 1, wherein the drive of the cleaning element is configured as a motor disposed relative to the rotational axis of the cleaning element.

* * * * *

UNITED STATES PATENT AND TRADEMARK OFFICE
CERTIFICATE OF CORRECTION

| | | |
|---|---|---|
| PATENT NO. | : 7,347,213 B2 | |
| APPLICATION NO. | : 10/505607 | |
| DATED | : March 25, 2008 | |
| INVENTOR(S) | : Linidler Horst Messing | |

It is certified that error appears in the above-identified patent and that said Letters Patent is hereby corrected as shown below:

Title Page,

Item [54] should read as follows:

[54] Title: DRIVE-THROUGH VEHICLE WASH WITH A BALANCED ROOF BRUSH

Signed and Sealed this

Seventeenth Day of June, 2008

JON W. DUDAS
*Director of the United States Patent and Trademark Office*

UNITED STATES PATENT AND TRADEMARK OFFICE
CERTIFICATE OF CORRECTION

PATENT NO. : 7,347,213 B2  Page 1 of 1
APPLICATION NO. : 10/505607
DATED : March 25, 2008
INVENTOR(S) : Horst Messing It is certified that error appears in the above-identified patent and that said Letters Patent is hereby corrected as shown below:

Title Page,

Item [54] should read as follows:

[54] Title: DRIVE-THROUGH VEHICLE WASH WITH A BALANCED ROOF BRUSH

Signed and Sealed this

Twenty-fourth Day of June, 2008

JON W. DUDAS
*Director of the United States Patent and Trademark Office*

UNITED STATES PATENT AND TRADEMARK OFFICE
CERTIFICATE OF CORRECTION

PATENT NO.        : 7,347,213 B2  Page 1 of 1
APPLICATION NO. : 10/505607
DATED             : March 25, 2008
INVENTOR(S)       : Horst Messing It is certified that error appears in the above-identified patent and that said Letters Patent is hereby corrected as shown below:

Title Page,

Item [54] and Column 1, lines 1 and 2 should read as follows:

Title: DRIVE-THROUGH VEHICLE WASH WITH A BALANCED ROOF BRUSH

This certificate supersedes the Certificates of Correction issued June 17, 2008 and June 24, 2008.

Signed and Sealed this

Twenty-second Day of July, 2008

JON W. DUDAS
*Director of the United States Patent and Trademark Office*